US011681968B2

(12) United States Patent
Dhaygude et al.

(10) Patent No.: US 11,681,968 B2
(45) Date of Patent: Jun. 20, 2023

(54) USER CONNECTOR BASED ON ORGANIZATION GRAPH

(71) Applicant: Microsoft Technology Licensing, LLC, Redmond, WA (US)

(72) Inventors: Amol Dattatray Dhaygude, Redmond, WA (US); Manjit Singh Gill, Woodinville, WA (US); Nikolay Mitev Trandev, Bremerton, WA (US); Aaron James Harrison, Bellevue, WA (US); Aleksey Ashikhmin, Redmond, WA (US); Amit Prem Manghani, Alameda, CA (US); Robert Allen Donahue, Seattle, WA (US); Wilson Waikon Ung, Renton, WA (US); Christopher Michael Trevino, Bremerton, WA (US); Neha Choudhary, Seattle, WA (US); Neha Parikh Shah, New York, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 564 days.

(21) Appl. No.: 16/739,393

(22) Filed: Jan. 10, 2020

(65) Prior Publication Data

US 2021/0216937 A1 Jul. 15, 2021

(51) Int. Cl.
*G06Q 10/0639* (2023.01)
*G06N 5/04* (2023.01)
*G06N 20/00* (2019.01)

(52) U.S. Cl.
CPC ......... *G06Q 10/06393* (2013.01); *G06N 5/04* (2013.01); *G06N 20/00* (2019.01)

(58) Field of Classification Search
CPC ..... G06Q 10/06393; G06N 20/00; G06N 5/04
USPC ........................................................ 705/7.11
See application file for complete search history.

(56) References Cited

U.S. PATENT DOCUMENTS

| 10,474,457 | B1* | 11/2019 | Pham | G06F 16/9538 |
|---|---|---|---|---|
| 10,810,361 | B1* | 10/2020 | Venkatraman | H04L 63/0421 |
| 2004/0024769 | A1* | 2/2004 | Forman | G06F 18/24323 |
| 2007/0226248 | A1* | 9/2007 | Darr | H04L 67/535 |
| | | | | 707/999.102 |
| 2014/0195396 | A1* | 7/2014 | Bhakta | G06Q 40/02 |
| | | | | 705/35 |
| 2018/0005121 | A1* | 1/2018 | Hoque | G06F 16/9024 |
| 2018/0115603 | A1* | 4/2018 | Hu | G06Q 50/01 |

(Continued)

OTHER PUBLICATIONS

Organization Mining Using Online Social Networks. Fire, Michael; Puzis, Rami. Networks and Spatial Economics 16.2: 545-578. Springer Nature. B.V. (Jun. 2016).*

(Continued)

*Primary Examiner* — Timothy Padot
(74) *Attorney, Agent, or Firm* — Schwegman Lundberg & Woessner, P.A.

(57) ABSTRACT

A system and method for identifying a user is described. The system identifies collaboration metrics based on user interaction data of users of an application from an enterprise. The system accesses enterprise organizational data of the enterprise and identifies topic data from the user interaction data and the enterprise organizational data. The system trains a machine learning model based on the collaboration metrics, the enterprise organizational data, and the topic data.

16 Claims, 14 Drawing Sheets

(56) References Cited

U.S. PATENT DOCUMENTS

2019/0377897 A1* 12/2019 Griffin .................. G06Q 10/06
2020/0409962 A1* 12/2020 Sarkis .................... G06Q 50/01
2020/0412676 A1* 12/2020 Kau .................... H04L 12/1822

OTHER PUBLICATIONS

A semantic social network-based expert recommender system. Davoodi, Elnaz; Kianmehr, Keivan; Afsharchi, Mohsen. Applied Intelligence 39.1: 1-13. Springer Nature B.V. (Jul. 2013).*

* cited by examiner

USER CONNECTOR BASED ON ORGANIZATION GRAPH

TECHNICAL FIELD

The subject matter disclosed herein generally relates to a special-purpose machine that analyzes communications between client devices, including computerized variants of such special-purpose machines and improvements to such variants. Specifically, the present disclosure addresses systems and methods for ranking users based on enterprise organizational data and interaction data of users of an enterprise application.

BACKGROUND

Interactions among users via an application within an enterprise setting may be difficult to be evaluated given the noise of the interaction data between the users. Furthermore, profile data provided by users or an administrator of a directory application associated with the enterprise application become outdated when the administrator does not update the profile data of a user.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
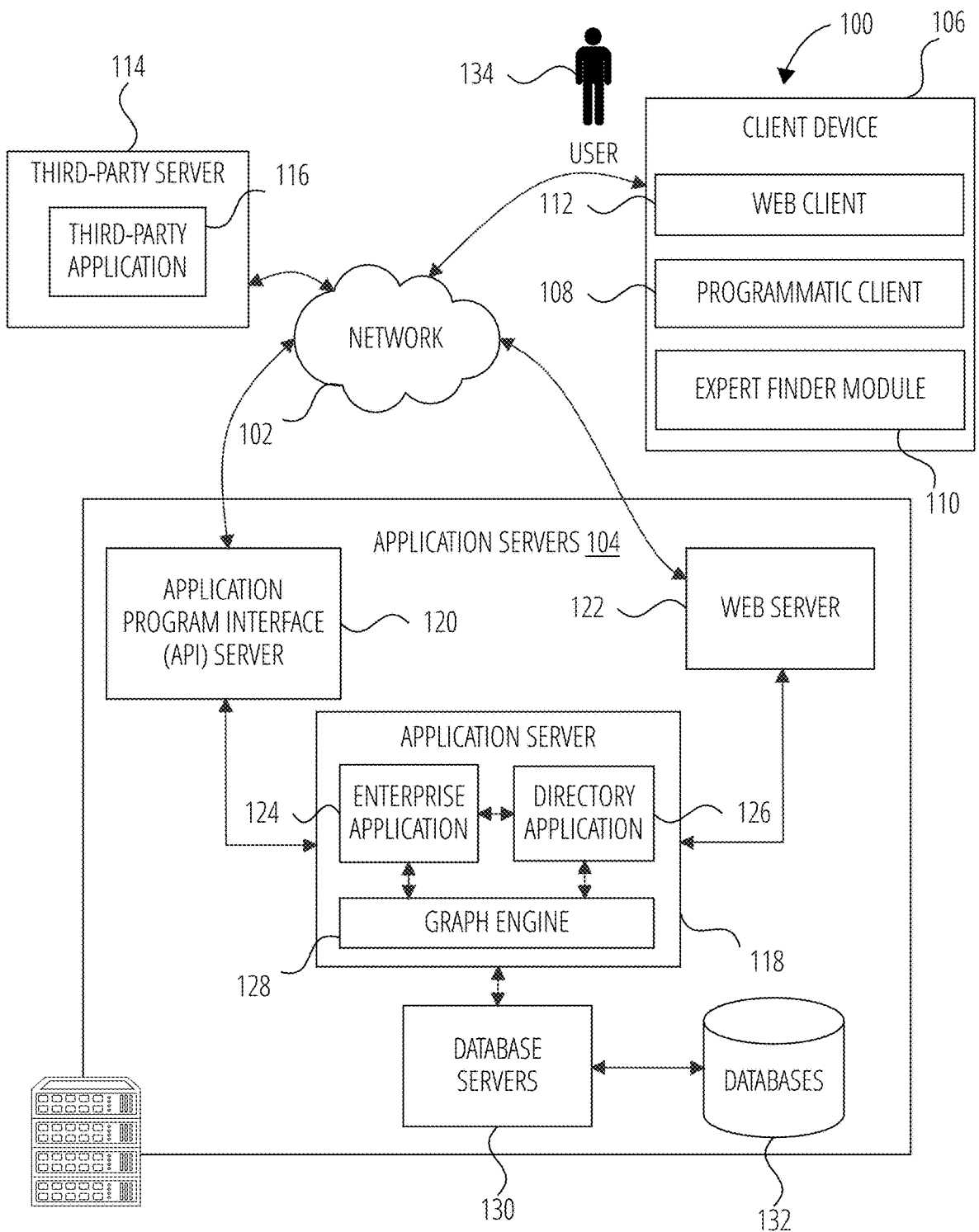
FIG. 1 is a diagrammatic representation of a networked environment in which the present disclosure may be deployed, in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Directories of enterprise users' profiles are often prone to become outdated because the directories rely on proactive input and regular updates from the users. Users rarely update their profile data (e.g., skills attribute, project attribute, specialty attribute) in an enterprise directory of an enterprise. As such, it may be difficult to ascertain relationships between users based on skill attributes. For example, a first user may have difficulty identifying a second user who has demonstrated an expertise in a particular field or topic because the second user has failed to update his/her user profile data (e.g., skill attribute) in the enterprise directory. The first user and second user may be users of an application and are part of an enterprise. An enterprise represents organizations or groups of users associated with an organization.

As a result, one or more of the methodologies described herein facilitate solving the technical problem of identifying users based on their outdated, unknown, or incorrect user profile data (e.g., outdated skill attribute). Data from a directory application is often manually inputted or updated by an administrator or the user of the application associated with the directory application. However, manual update of data is often prone to error and inaccuracies and can lead a first user to incorrectly identify a second user based on inaccurate user profile data. As such, one or more of the methodologies described herein may obviate a need for certain efforts or computing resources (e.g., monitoring and manually updating various attributes of the user profile of every user of an enterprise). Examples of such computing resources include processor cycles, network traffic, memory usage, data storage capacity, power consumption, network bandwidth, and cooling capacity.

The present application describes a machine learning model that is trained and used to generate a graph (also referred to as unified people or personnel graph) that indicates personnel (also referred to as people or users) organizational network relationships (e.g., project manager, lead engineer), collaborations topics (e.g., project x), collaboration patterns (e.g., weekly team meetings, chat activities on weekends), network metrics (e.g., degree of connections, reach index (closeness), page index (influence index), collaboration strength on topics), skills (e.g., expert on topic x), projects (e.g., user worked on project x), time zone (e.g., user in located in PST time zone), network degree of connection of expert from requestor (e.g., user x and user y both report to user z), reach index of expert (e.g., size of user x social network in the enterprise), expert page rank (e.g., ranking of user x on topic x within the enterprise), collaboration time of expert on topic (e.g., user x has worked on topic x for one year), past requests response times from experts (e.g., user x replies to user y's request to help on topic x within one day), request response rate of experts (e.g., user x replies to 1 out of 10 requests for help on topic x), referral recommendations (e.g., user x refers user y to user z), open requests in experts queue (e.g., user x has 5 expert requests on topic x in a queue of user x who is highly ranked as an expert for topic x). The unified people graph can be used to help identify experts based on the self-updated data (e.g., user x updates a profile on the enterprise directory that lists topic x in a skill attribute).

The present application describes a graph model built using collaboration/topic analysis and network analysis on collaboration data from an enterprise application (or collaboration data from other third-party applications). The unified graph contains graph vertices derived from collaboration data (e.g., people and topics connected in graph as per their relations in the enterprise). The unified graph is based on organizational data and user profile about users of the enterprise. The organization data includes, for example, as Human Resource (HR) attributes, skills attributes, projects attributes, Customer Relationship Management (CRM) data, specific applications data. A machine learning model updates the unified graph (without an administrator or an enterprise user having to manually update his/her profile data) using the latest collaboration data (as users interact with each other via the enterprise application). As such, the unified graph is automatically generated and regularly updated based on passive collaboration data from enterprise applications (e.g., email application, calendar application, chat application, intranet application, storage application) in the organization without any active involvement (e.g., manual update of user profile in the directory) from enterprise users of the organization.

In one example, the application receives, from the first user, a request for help for a particular field or topic (e.g., topic x). The application uses the graph to identify a second user that may be an expert in topic x as inferred from collaboration data based on enterprise organizational data (e.g., network degree of separation between the first and second users (e.g., lowest number of degrees of separation)). Other examples of identifying the second user may be filtering users with inferred expertise in topic x, where the filtered users are from a group of peer engineers, team leaders, project managers, and so forth. The application communicates the request for help (optionally identifying the first user) to the second user. The application maintains the anonymity of the second user to the first user until the second user approves the request.

In another example, the directory application updates the user profile data of the second user (e.g., update a value of the skill attribute to include project x) based on the collaboration/topic data (from the enterprise application) related to the second user. In a further example, the directory application generates a new attribute (e.g., possible/inferred skill attribute) based on the inferred skills of the second user and the collaboration/topic data in the user profile data of the second user (without modifying a value of the skill attribute in the user profile data of the second user).

The present application describes a system and method for generating a graph that models organizational relational network graph is described. The graph can be used to identify an enterprise user with a skill or expertise attribute in relation to another enterprise user. In one example embodiment, the system identifies collaboration metrics based on user interaction data of enterprise users of enterprise applications. The system accesses enterprise organizational data of the enterprise and identifies topic data from the user interaction data and the enterprise organizational data. The system trains a machine learning model based on the collaboration metrics, the enterprise organizational data, and the topic data.

FIG. 1 is a diagrammatic representation of a network environment 100 in which some example embodiments of the present disclosure may be implemented or deployed. One or more application servers 104 provide server-side functionality via a network 102 to a networked user device, in the form of a client device 106. A user 134 operates the client device 106. The client device 106 includes a web client 112 (e.g., a browser), a programmatic client 108 (e.g., an email/calendar application such as Microsoft Outlook™, an instant message application, a document writing application, a shared document storage application) that is hosted and executed on the client device 106.

In one example embodiment, the programmatic client 108 includes an expert finder module 110 that enables the user 134 to search for or submit a query for an expert user (e.g., a user from the same or different enterprise who is ranked higher than other users of the enterprise in regard to a topic and has the lowest number degree of separation from the user 134). In another example embodiment, the expert finder module 110 monitors interaction data from the web client 112 and the programmatic client 108 to the application servers 104. The interaction data identifies items that are communicated from another user of an enterprise to the user 134 and from the user 134 to another user of the enterprise. Examples of interaction data include but are not limited to email communications, meeting communications, instant messages, shared document comments, and any communication with a recipient (e.g., a user from the enterprise). The expert finder module 110 uses the interaction data to help identify the expert user. It is noted that the expert finder module 110 represents one example of a user feature provided by a graph engine 128 that forms a social graph based on interaction/collaboration data and user profile data.

The expert finder module 110 may operate with the web client 112 and/or the programmatic client 108. In another example embodiment, the expert finder module 110 is part of the programmatic client 108 or web client 112. For example, the expert finder module 110 may operate as an extension or add on to the web client 112. The expert finder module 110 communicates with the application servers 104.

An Application Program Interface (API) server 120 and a web server 122 provide respective programmatic and web interfaces to application servers 104. A specific application server 118 hosts an enterprise application 124, a directory application 126, and the graph engine 128. The enterprise application 124, the directory application 126, and the graph engine 128 include components, modules and/or applications.

The enterprise application 124 may include an application operated by the enterprise 224. Examples of enterprise application 124 include collaborative applications (e.g., a server side email/calendar enterprise application, a server side instant message enterprise application, a document writing enterprise application, a shared document storage enterprise application) that enable users of an enterprise to collaborate and share document, messages, and other data (e.g., meeting information, common projects) with each other. For example, the user 134 at the client device 106 may access the enterprise application 124 to edit documents that are shared with other users of the same enterprise. In another example, the client device 106 accesses the enterprise application 124 to retrieve or send messages or emails to and from other peer users of the enterprise. Other examples of enterprise application 124 includes content management systems, and knowledge management systems.

The directory application 126 includes a directory application (also referred to as active directory) that maintains enterprise organizational data. One example of enterprise organizational data include user profile data of enterprise users of the enterprise. For example, an enterprise user profile of an enterprise user includes a user ID, a user email, a user department, a user manager, user group projects, user employment status, user skills, user expertise, user experience, user background, any information provided by other department (e.g., Human Resource), and so forth. In another example embodiment, the directory application 126 includes or has access to other enterprise systems such as Customer Relation Management (CRM) systems, social network profile system, or other survey systems.

In one example embodiment, the graph engine 128 communicates with the enterprise application 124 to access interaction/collaboration data from users of the enterprise application 124. The graph engine 128 also communicates with the directory application 126 to access enterprise organizational data. In another example embodiment, the graph engine 128 communicates with the expert finder module 110 to access interaction data from the user 134 with other users of the enterprise. The graph engine 128 communicates with the expert finder module 110 supported by the web server 122 and identifies another enterprise user to the user 134 with the programmatic client 108. In one example, the web client 112 communicate with the graph engine 128 and enterprise application 124 via the programmatic interface provided by the Application Program Interface (API) server 120.

The graph engine 128 forms a dataset comprising the interaction/collaboration data and the enterprise organizational data. The graph engine 128 trains a machine learning model based on the dataset and forms a graph of user interactions and user expertise based on the machine learning model. The machine learning model is described below with respect FIG. 4. The graph engine 128 receives a request from the expert finder module 110 to identify an expert user related to a particular topic. The graph engine 128 ranks enterprise users based on the topic, interaction/collaboration data of the user 134, interaction/collaboration data between enterprise users of the enterprise, and the enterprise organization data of the enterprise. The graph engine 128 generates a recommendation of an expert user based on the ranking and provides the recommendation to the expert finder module 110.

In another example embodiment, the graph engine 128 provides other user functions or features that allow the user 134 to identify other enterprise users based on their relative influence (e.g., an influencer who may be a user with a large social network size within the enterprise), and identify enterprise users with skills validated based on their interactions with other enterprise users (or other users outside the enterprise). In another example, the enterprise application 124 may validate the skills of a user based on information from other sources (e.g., social media web sites that profile the user and their skills).

The application server 118 is shown to be communicatively coupled to database servers 130 that facilitates access to an information storage repository or databases 132. In an example embodiment, the databases 132 includes storage devices that store information to be processed by the enterprise application 124 and the graph engine 128.

Additionally, a third-party application 116 may, for example, store another part of the enterprise application 124, or include a cloud storage system. The third-party application 116 executing on a third-party server 114, is shown as having programmatic access to the application server 118 via the programmatic interface provided by the Application Program Interface (API) server 120. For example, the third-party application 116, using information retrieved from the application server 118, may supports one or more features or functions on a website hosted by the third party.

Figure 2:
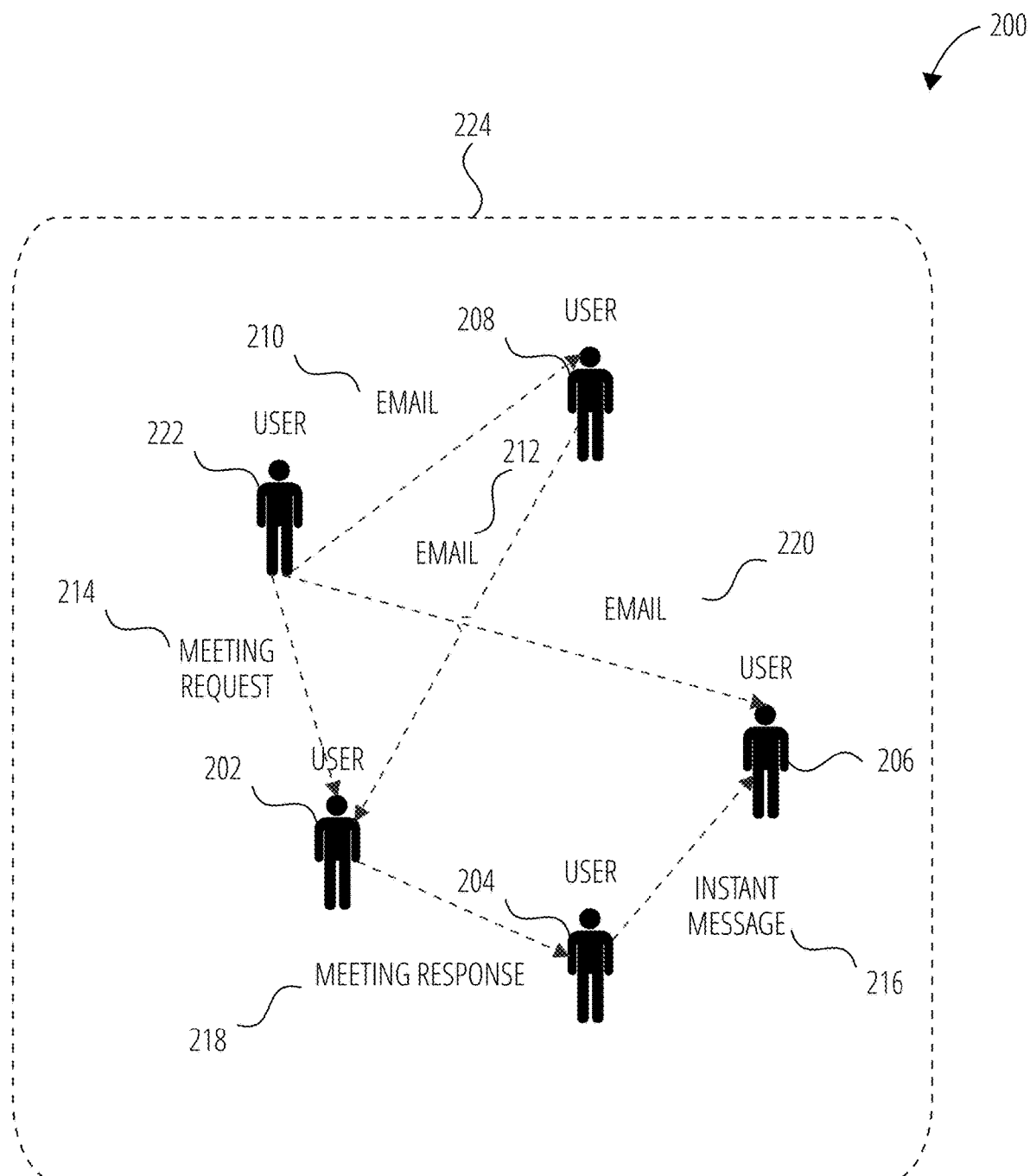
FIG. 2 is a diagrammatic representation of interactions between users in an enterprise, in accordance with one example embodiment.

FIG. 2 is a graph 200 illustrating interactions between users in an enterprise, in accordance with some example embodiments. The diagram illustrates users (e.g., user 202, user 206, user 208, user 222) that are part of an enterprise 224. Each user operates a corresponding device (not shown) using one or more client applications (not shown) to communicate and collaborate with other users. In one example embodiment, each peer user client applications communicate with the application server 118.

For example, user 222 sends an email 210 to user 208, sends an email 220 to user 206, and sends a meeting request 214 to user 202. The user 208 receives the email 210 from user 222, sends an email 212 to user 202. The user 202 receives the meeting request 214 from user 222, receives the email 212 from user 208, and sends a meeting response 218 to user 204. The user 204 receives the meeting response 218 from user 202 and sends an instant message 216 to user 206.

In one example embodiment, the graph engine 128 collects user interaction data representing the interactions between peer users described above. In another example embodiment, the expert finder module 110 collects interaction data from a corresponding user of a client device. The graph engine 128 and the expert finder module 110 may collect the interaction data for a preset period of time (e.g., a one-week interval, year to date, or other time frame).

In another example embodiment, the graph engine 128 collects user interaction data for a user up to a preset degree of contacts. For example, if the preset degree is one, the interaction data for the user 222 includes interaction data for user 208, user 202, and user 206. A core working group of the user 222 would thus include user 208, user 202, and user 206.

Figure 3:
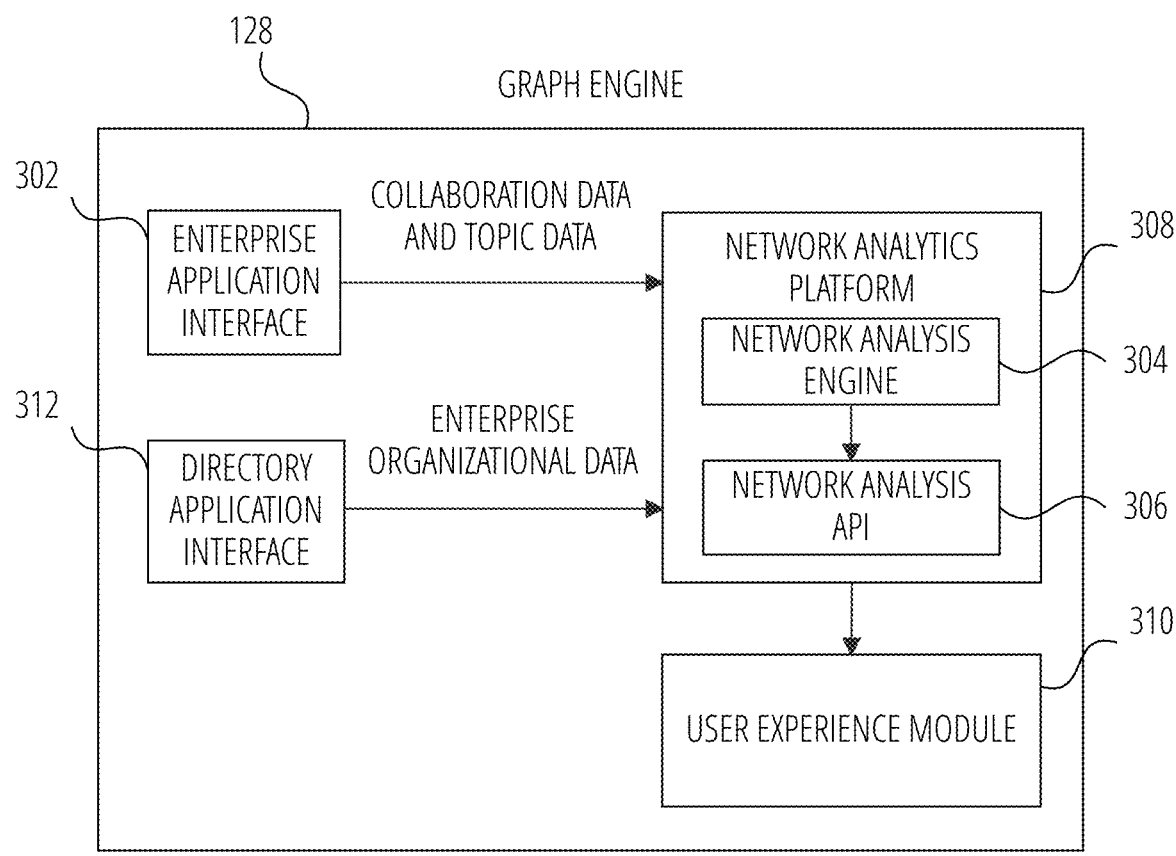
FIG. 3 is a block diagram illustrating a graph engine in accordance with one example embodiment.

FIG. 3 is a block diagram illustrating a graph engine 128 in accordance with one example embodiment. The graph engine 128 comprises an enterprise application interface 302, a network analysis engine 304, a network analysis API 306, a network analytics platform 308, a user experience module 310, and a directory application interface 312.

The enterprise application interface 302 accesses collaboration data and topic data from the enterprise application 124. The collaboration data and topic data are based on user interaction data between enterprise users of the enterprise. For example, a first enterprise user emails a second enterprise user a message related to a project (e.g., using email subject header or identifying preset keywords in the body of the message). The collaboration data identifies the interactions between the first enterprise user and the second enterprise user (how often the first and second enterprise users communicate with each other, have meetings, collaborate on common projects, when the first and second enterprise users communicate, with whom the first and second enterprise users communicate), and identifies a topic attribute associated with the communications (e.g., the topic can be identified from a subject header or from a title of a file attached to the emails). Other methods of identifying or extracting a topic attribute to a communication (e.g., a message) include parsing the message for key topics related to a predefined set of topics (e.g., accounting, machine learning, project x, skill y, etc.) defined for the enterprise.

In another example embodiment, the enterprise application interface 302 retrieves user interaction data from a combination of the expert finder module 110, the web client 112, the programmatic client 108, and the enterprise application 124.

The directory application interface 312 accesses enterprise organizational data (e.g., user hierarchy data) from the directory application 126. The enterprise organizational data include, for example, user profile data of enterprise users of the enterprise. For example, an enterprise user profile of an enterprise user includes a user ID, a user email, a user department, a user manager, user group projects, user employment status, user skills, user expertise, user experience, user background, any information provided by other department (e.g., Human Resource), and so forth. In another example embodiment, the directory application interface 312 accesses enterprise organizational data to other enterprise systems such as Customer Relation Management (CRM) systems, social network profile system, or other survey systems. These systems can be internal or external to the directory application 126.

The network analytics platform 308 trains a machine learning model based on a dataset that comprises the collaboration data and topic data, and enterprise organizational data. In one example embodiment, the network analytics platform 308 comprises the network analysis engine 304 and the network analysis API 306. The network analysis engine 304 generates a collaboration-topic graph that depicts interactions between enterprise users relative to identified topics based on the machine learning model. The graph may indicate (e.g., enterprise user HR attributes, collaboration map (e.g., who the enterprise users communicate with), time allocation (e.g., when, how long, and how often do the users communicate, collaboration topics (e.g., what topic do the users communicate about), skills and projects (e.g., which projects are the users collaborating on). In another example embodiment, the network analysis engine 304 ranks the users based on their relevance to a topic attribute based on the dataset. The ranking may be based on number and frequency of interactions related to the topic. For example, a user will be ranked higher with a higher number of interactions/collaborations (related to a keyword or topic) with other users of the enterprise within a preset duration and more frequent interactions/collaborations (related to a keyword or topic) with other users of the enterprise within the present duration.

The network analysis API 306 provides a client with interface access to the results from the machine learning model generated by the network analytics platform 308. For example, the user experience module 310 accesses data from the network analysis engine 304 via the network analysis API 306 to provides different types of functionalities (e.g., user experiences). For example, the user experience includes finding an expert user related to a topic, finding an influencer (e.g., an enterprise user having clout or influence based on their interaction data, organization hierarchy, expertise, and enterprise user profile), and identifying enterprise users with particular skillsets.

Figure 4:
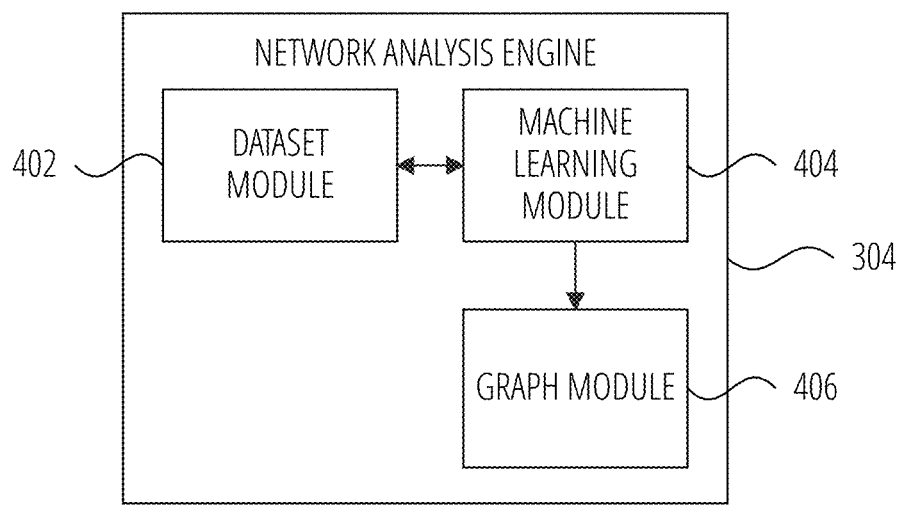
FIG. 4 is a block diagram illustrating a network analysis engine in accordance with one example embodiment.

FIG. 4 is a block diagram illustrating a network analysis engine 304 in accordance with one example embodiment. The network analysis engine 304 includes a dataset module 402, a machine learning module 404, and a graph module 406. The dataset module 402 forms a dataset based on the collaboration data and topic data (from enterprise application interface 302) and the enterprise organizational data (from directory application interface 312). The machine learning module 404 includes a machine learning engine that trains the machine learning model based on the dataset from the dataset module 402. Example features include collaboration metrics, topic attribute, and organizational enterprise users network graph. Examples of organizational network graph properties include degree of connections, reach index (closeness), page index (influence index) and collaboration strength on topics. In another example, the network analysis engine 304 includes a machine learning-based natural language processor for translating free form user input query into contextual topics search condition. The query may include additional data such as skills, projects, time zone. The machine learning module 404 performs a search and maps an expert to the user profile of the enterprise user submitting the request.

The machine learning module 404 manages a learning model for an expert (a user with a high likelihood that the user is proficient in a specific field or area). In one example embodiment, the machine learning module 404 analyzes events on the enterprise application 124 to identify trends (e.g., a user appears to have frequent communications with other users regarding a particular topic or subject, a user appears to have frequent meetings related to a particular topic, a user appears to be in multiple group chat related a particular topic). The machine learning module 404 accesses the collaboration data and topic data via the enterprise application interface 302 from enterprise application 124. Using the collaboration data and topic data, the machine learning module 404 can identify trends. For example, the machine learning module 404 learns, based collaboration communications from a user, that the user is likely an expert in a particular field because the user has composed many emails on the particular topic and has collaborated on frequent occasion with other users on projects related to the particular topic; thus, building a learning model.

Based on the learning model, the machine learning module 404 can, in one embodiment, suggest or identify a user associated with a particular expertise or specific topic. In a further embodiment, the machine learning module 404 can proactively identify expert users on a particular topic and connect a user with the expert users when the machine learning module 404 detects that the user is working on a project related to the particular topic. In some cases, the machine learning module 404 may present the identified expert information when the user appears to collaborate with other users on the particular topic. For example, if a first user shares a document related to topic x to a second user, the machine learning module 404 identifies an expert user on topic x to the first user with the least number of social network degree of separation from the first user (e.g., the first user and the expert user are directly connected to a common user).

In addition to learning trends regarding users who are expert in a particular field, the machine learning module 404 also identifies trends for the expert users. For example, the machine learning module 404 may learn that the expert user rarely replies to requests for assistance from other users who are not connected to the expert user. In another example, the machine learning module 404 learns that the expert user response rate is higher for requests from users that are connected by two degrees of separation. All of the trends identified by the machine learning module 404 may be stored at the databases 132 or provided to the graph module 406 for further processing.

In another example embodiment, the network analysis engine 304 generates ranks and relevance scores for experts matching requestors search criterion and consider additional factors/features (e.g., such as network degree of connection of expert from requestor, reach index of expert, expert page rank, collaboration time of expert on topic, past requests response times from experts, request response rate of experts, referral recommendations, open requests in experts queue).

Figure 12:
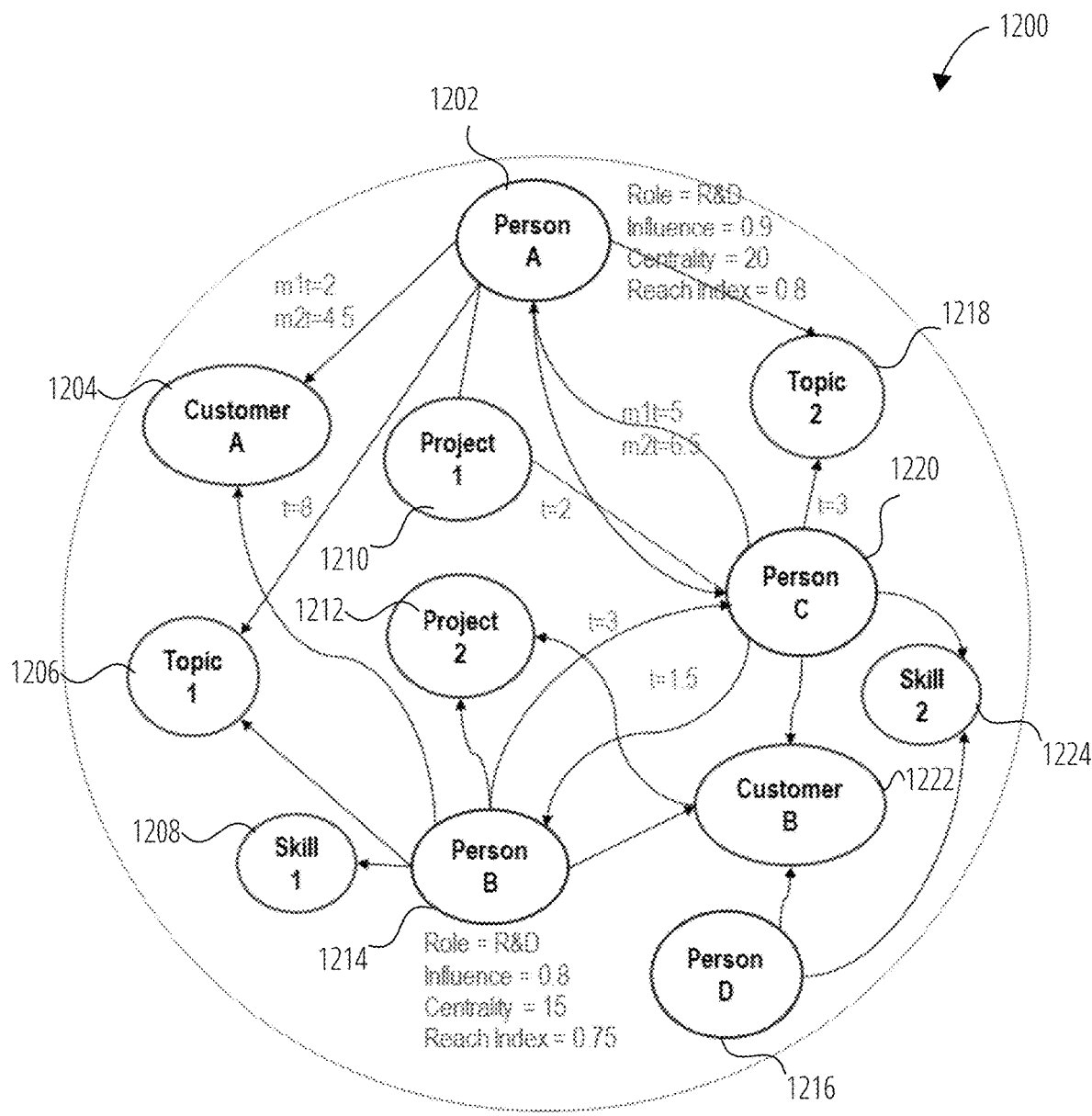
FIG. 12 illustrates an example of a unified graph in accordance with one example embodiment.
Figure 13:
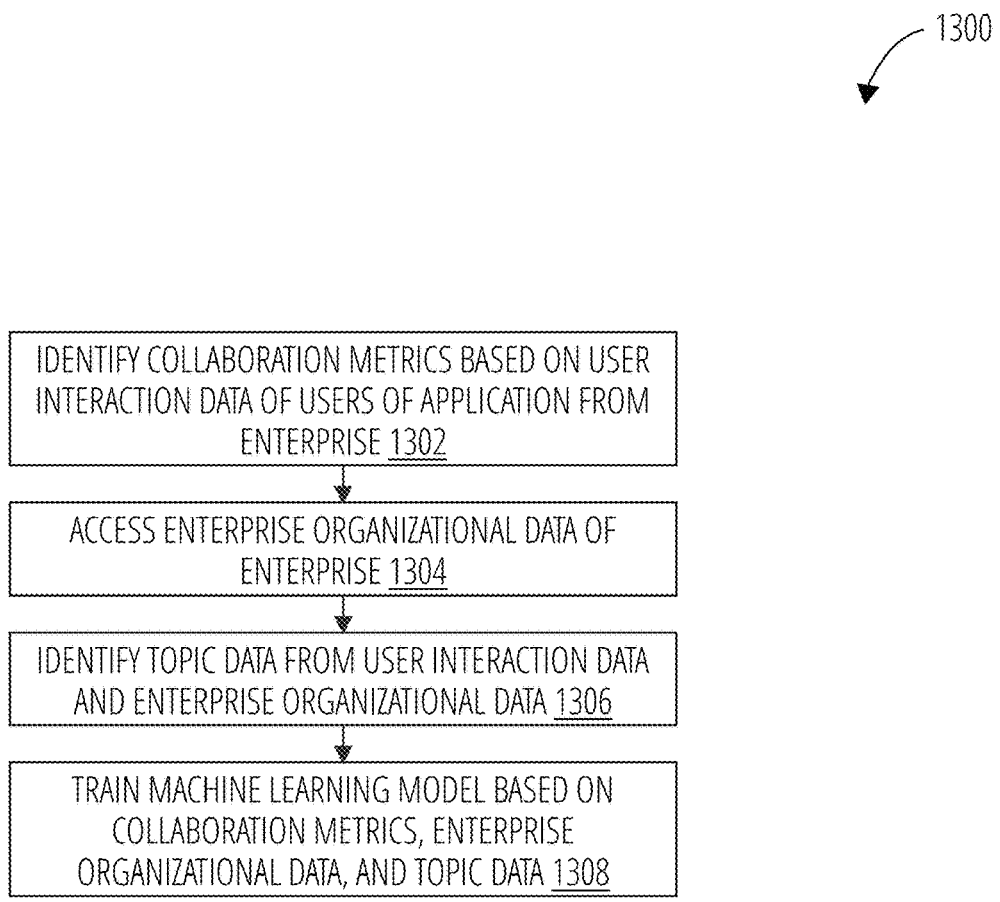
FIG. 13 illustrates a routine 1300 in accordance with one example embodiment.

The graph module 406 generates a collaboration-topic graph based on the machine learning model. FIG. 12 illustrates an example of a collaboration-topic graph.

Figure 5:
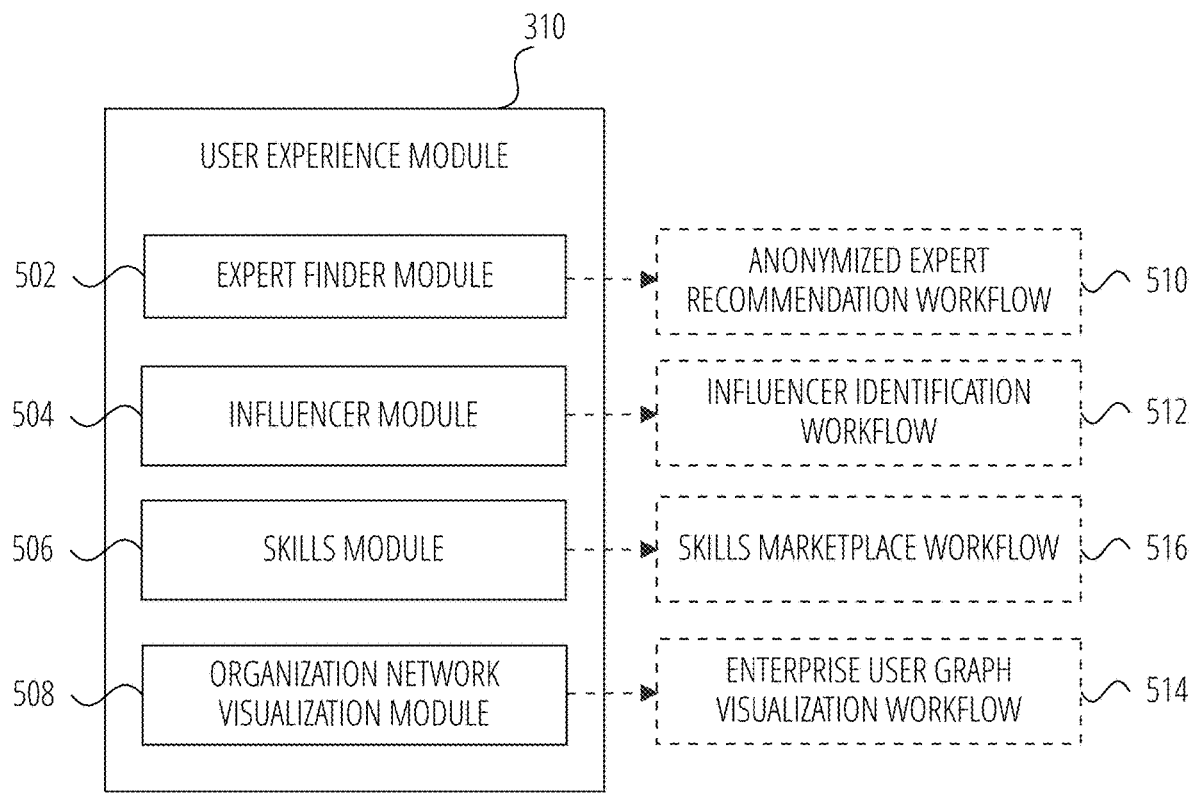
FIG. 5 is a block diagram illustrating a user experience module in accordance with one example embodiment.

FIG. 5 is a block diagram illustrating a user experience module in accordance with one example embodiment. The user experience module 310 includes an expert finder module 502, an influencer module 504, a skills module 506, an organization network visualization module 508.

The user experience module 310 makes use of the machine learning model and the graph generated by the network analysis engine 304 to provide different types of user experiences. The expert finder module 502 enables an enterprise user to request for an expert by identifying a topic attribute. The expert finder module 502 triggers the anonymized expert recommendation workflow 510 to identify the expert based on collaboration-topic graph of graph module 406. For example, the expert finder module 502 identifies an expert user based on interaction/collaboration metrics from the expert/requestor, degree of connections between the expert and the requestor, the expert user profile, the requestor user profile.

In one example embodiment, the anonymized expert recommendation workflow 510 protects the privacy of experts in the enterprise by not revealing an identification of the expert to the requestor without consent or approval from the expert. As such, the requestor does not receive any identifiable information about the experts during the search process. The requestor obtains information about an expert when the expert consents and accepts a request sent by requestor. In one example embodiment, the requestor also remains anonymous to the expert (e.g., the expert does not know the identification of the requestor).

The influencer module 504 triggers an influencer identification workflow 512 that uses the graph to identify an enterprise user considered to be an influencer. For example, a user is considered an influencer when collaboration metrics of the user exceed a preset threshold. For example, a user who is invited to many meetings, who leads a team, who collaborates with many users may be considered an influencer. The influencer module 504 may use the graph to identify influencers based on the collaboration metrics of users, topic metrics, and enterprise organizational metrics.

The skills module 506 triggers a skills marketplace workflow 516 that uses the graph to identify users with specific skillsets. Traditional systems rely on the users to enter their skillset attributes in a database. Even if the data is entered by the user, the users rarely update their skillset attributes in the database. Moreover, skill terminology may be specific. As such, there are some organizational level topics, niche areas that do not get added to the skills database or user profile. The skills module 506 leverages organizational network graph analysis (from graph module 406) for accurate recommendations or identification of users who fit a particular skillset. For example, the user profile may be based on a template that only specify a limited number of values of skill attribute (e.g., skill x, skill y, skill z). The skills module 506 generates a new value (e.g., skill a) for the skill attribute based on the graph.

The organization network visualization module 508 triggers an enterprise user graph visualization workflow 514 that causes a graphical representation of the collaboration-topic graph from graph module 406. FIG. 12 illustrates an example of a collaboration-topic graph.

Figure 6:
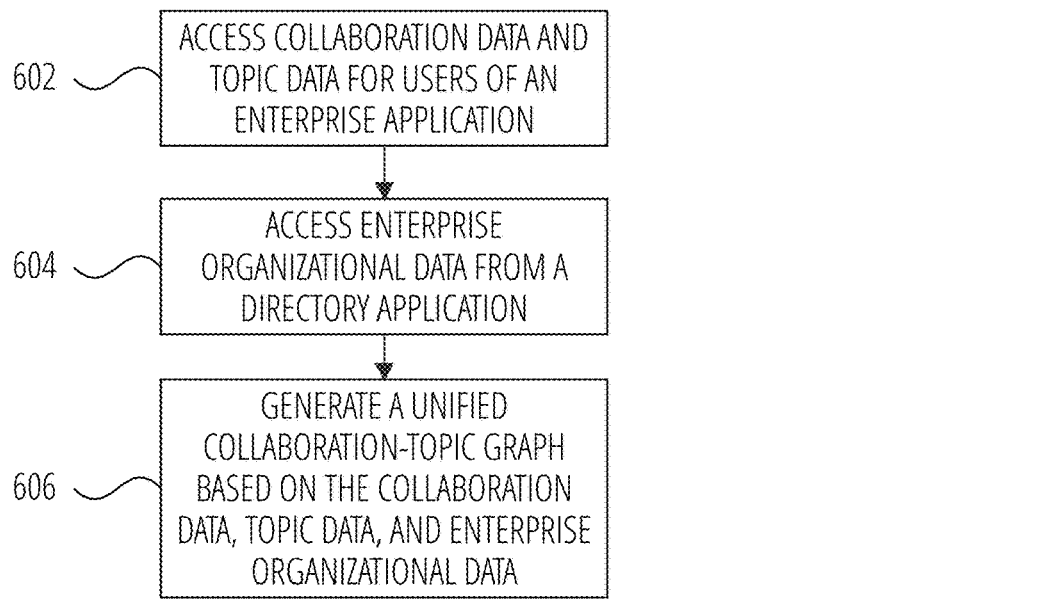
FIG. 6 is a flow diagram illustrating a method for generating a graph in accordance with one example embodiment.

FIG. 6 is a flow diagram illustrating a method 600 for generating a graph in accordance with one example embodiment. Operations in the method 600 may be performed by the graph engine 128, using components (e.g., modules, engines) described above with respect to FIG. 3. Accordingly, the method 600 is described by way of example with reference to the graph engine 128. However, it shall be appreciated that at least some of the operations of the method 600 may be deployed on various other hardware configurations or be performed by similar components residing elsewhere. For example, some of the operations may be performed at the expert finder module 110.

At block 602, the network analytics platform 308 accesses collaboration data and topic data for users of an enterprise application from the enterprise application 124 via the enterprise application interface 302. At block 604, the network analytics platform 308 accesses enterprise organizational data from the directory application 126 via the directory application interface 312. At block 606, the network analytics platform 308 generates a unified collaboration-topic graph based on the collaboration data, topic data, and enterprise organization data.

Figure 7:
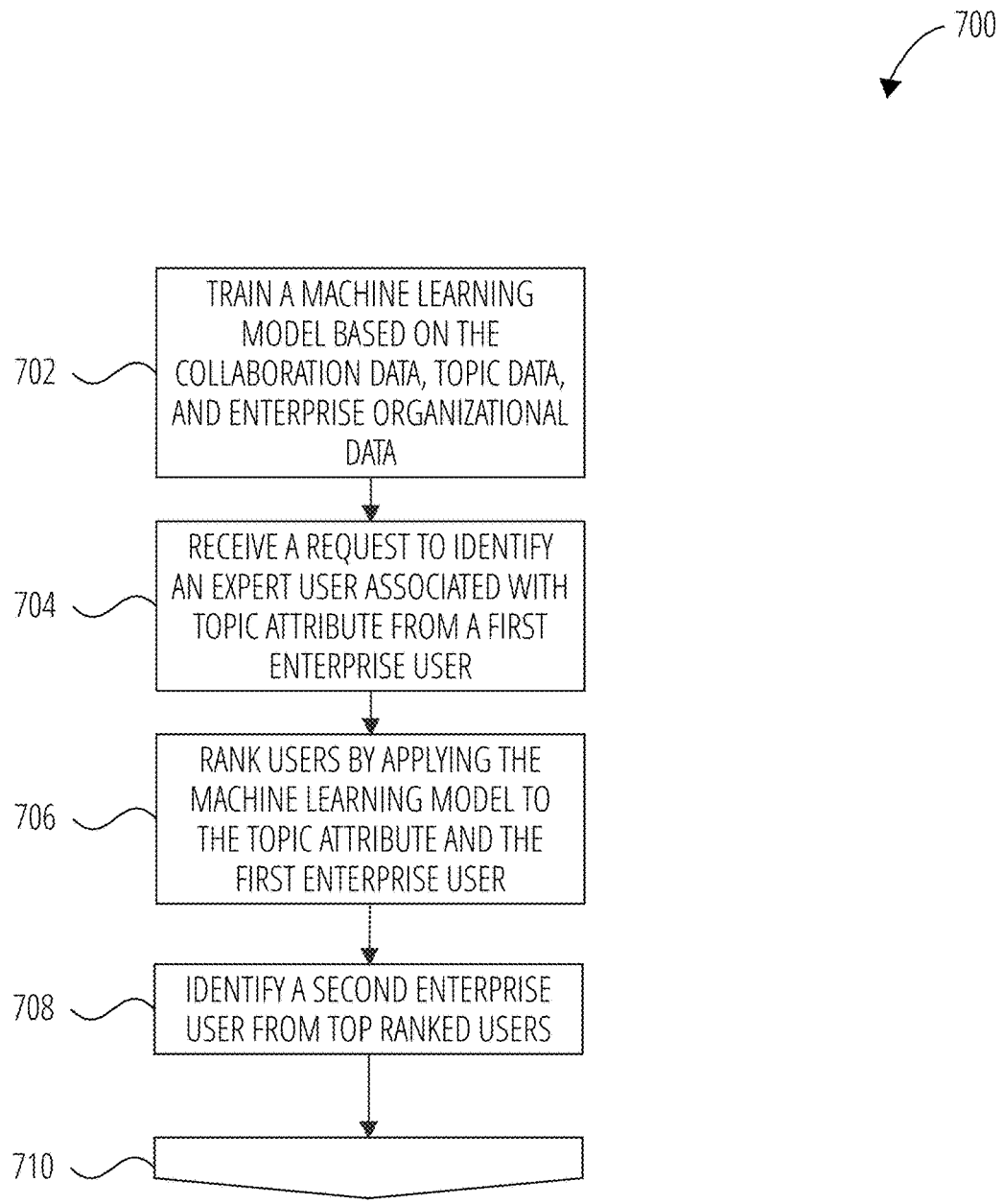
FIG. 7 is a flow diagram illustrating a method for identifying an expert user in accordance with one example embodiment.

FIG. 7 is a flow diagram illustrating a method 700 for identifying an expert user in accordance with one example embodiment. Operations in the method 700 may be performed by the graph engine 128, using components (e.g., modules, engines) described above with respect to FIG. 3. Accordingly, the method 700 is described by way of example with reference to the graph engine 128. However, it shall be appreciated that at least some of the operations of the method 700 may be deployed on various other hardware configurations or be performed by similar components residing elsewhere. For example, some of the operations may be performed at the expert finder module 110.

At block 702, the machine learning module 404 trains a machine learning model based on the collaboration data, topic data, and enterprise organizational data. At block 704, the expert finder module 502 receives a request to identify an expert user associated with topic attribute from a first enterprise user. At block 706, the expert finder module 502 ranks users by applying the machine learning model to the topic attribute and relative to the first enterprise user. At block 708, the expert finder module 502 identifies a second enterprise user from top ranked users. The process can continue at block 710.

Figure 8:
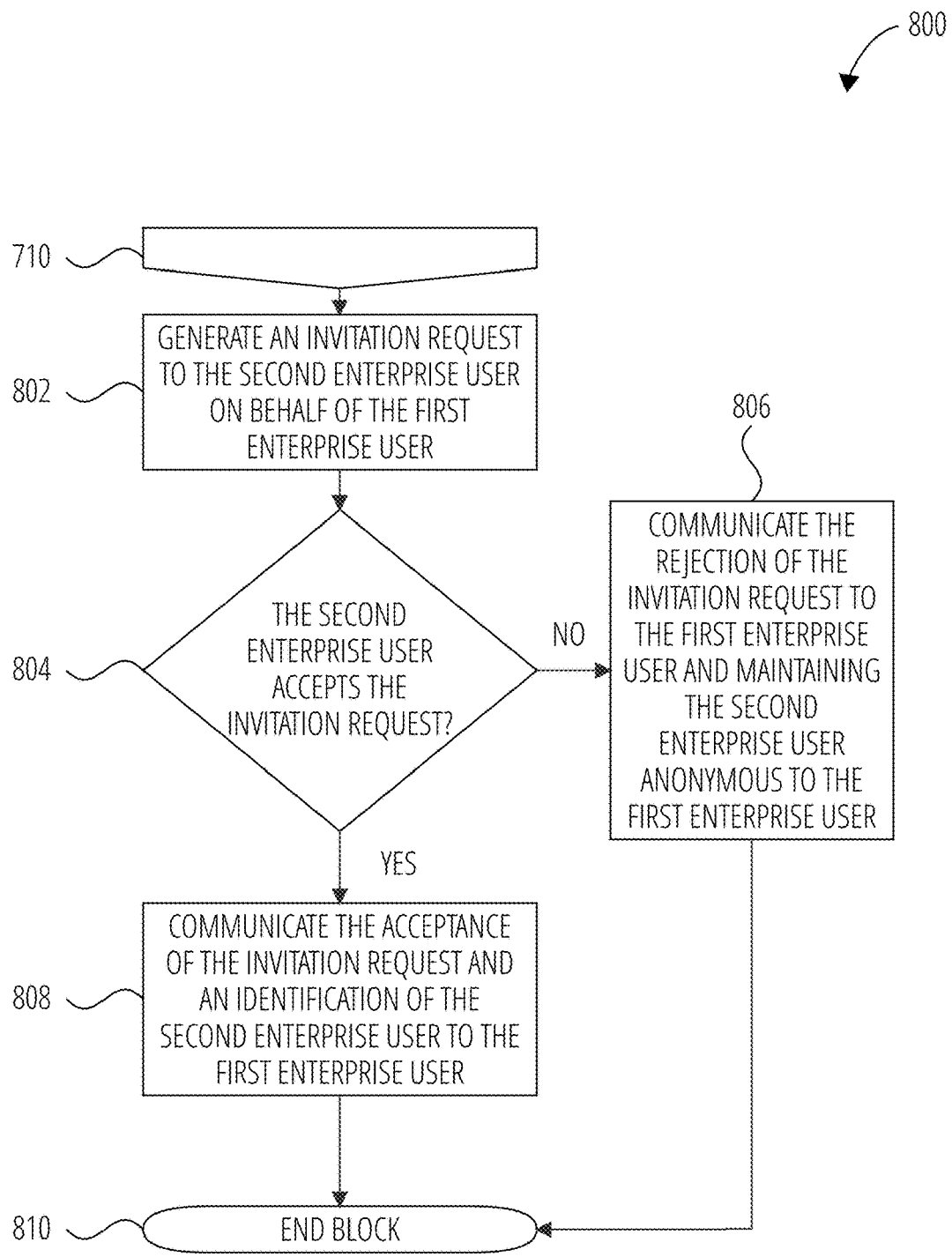
FIG. 8 is a flow diagram illustrating a method for identifying an expert user in accordance with one example embodiment.

FIG. 8 is a flow diagram illustrating a method 800 for identifying an expert user in accordance with one example embodiment. Operations in the method 800 may be performed by the graph engine 128, using components (e.g., modules, engines) described above with respect to FIG. 3. Accordingly, the method 800 is described by way of example with reference to the graph engine 128. However, it shall be appreciated that at least some of the operations of the method 800 may be deployed on various other hardware configurations or be performed by similar components residing elsewhere. For example, some of the operations may be performed at the expert finder module 110.

The process may continue from block 710. At block 802, the expert finder module 502 generates an invitation request to the second enterprise user on behalf of the first enterprise user. In one example embodiment, the invitation request identifies the first enterprise user (e.g., the requestor). In another example embodiment, the invitation request does not identify the first enterprise user (e.g., the requestor) and keep the first enterprise anonymous.

At decision block 804, the expert finder module 502 determines whether the second enterprise user accepts the invitation request. If the invitation request is accepted, the process moves to block 808. If the invitation request is declined, the process moves to block 806.

At block 806, the expert finder module 502 communicates the rejection of the invitation request to the first enterprise user while maintaining the identity of the second enterprise user anonymous to the first enterprise user.

At block 808, the expert finder module 502 communicates the acceptance of the invitation request and the identity of the second enterprise user to the first enterprise user. The process ends at end block 810.

Figure 9:
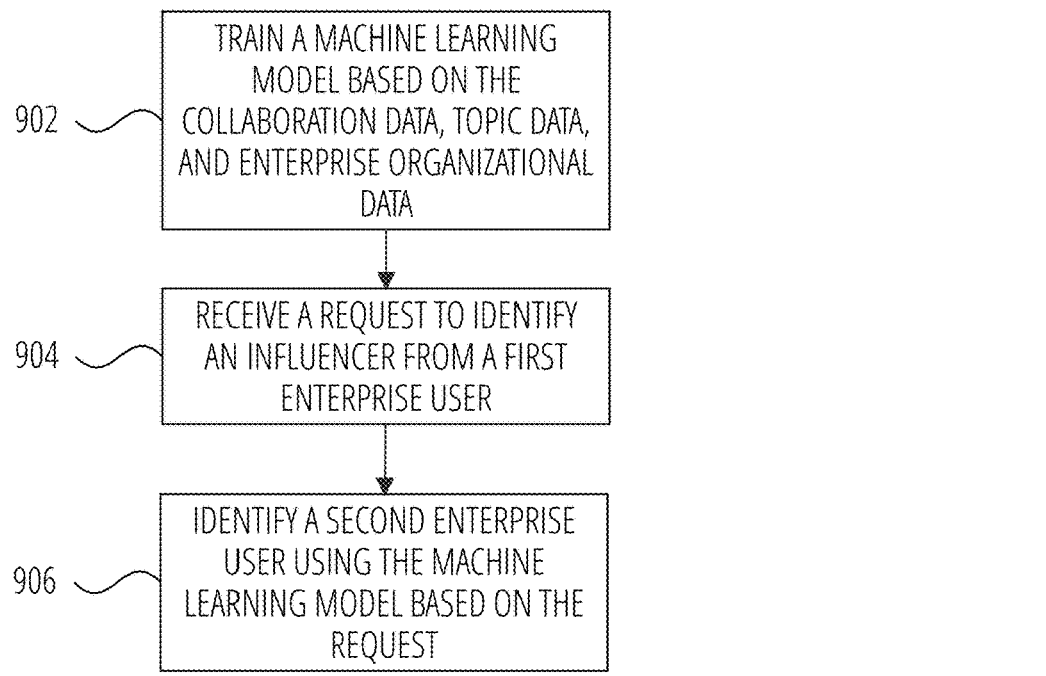
FIG. 9 is a flow diagram illustrating a method for identifying an influencer in accordance with one example embodiment.

FIG. 9 is a flow diagram illustrating a method 900 for identifying an influencer in accordance with one example embodiment. Operations in the method 900 may be performed by the graph engine 128, using components (e.g., modules, engines) described above with respect to FIG. 3. Accordingly, the method 900 is described by way of example with reference to the graph engine 128. However, it shall be appreciated that at least some of the operations of the method 900 may be deployed on various other hardware configurations or be performed by similar components residing elsewhere. For example, some of the operations may be performed at the expert finder module 110.

At block 902, the machine learning module 404 trains a machine learning model based on the collaboration data, topic data, and enterprise organizational data. At block 904, the influencer module 504 receives a request to identify an influencer from a first enterprise user. At block 906, the influencer module 504 identifies a second enterprise user using the machine learning model based on the request.

Figure 10:
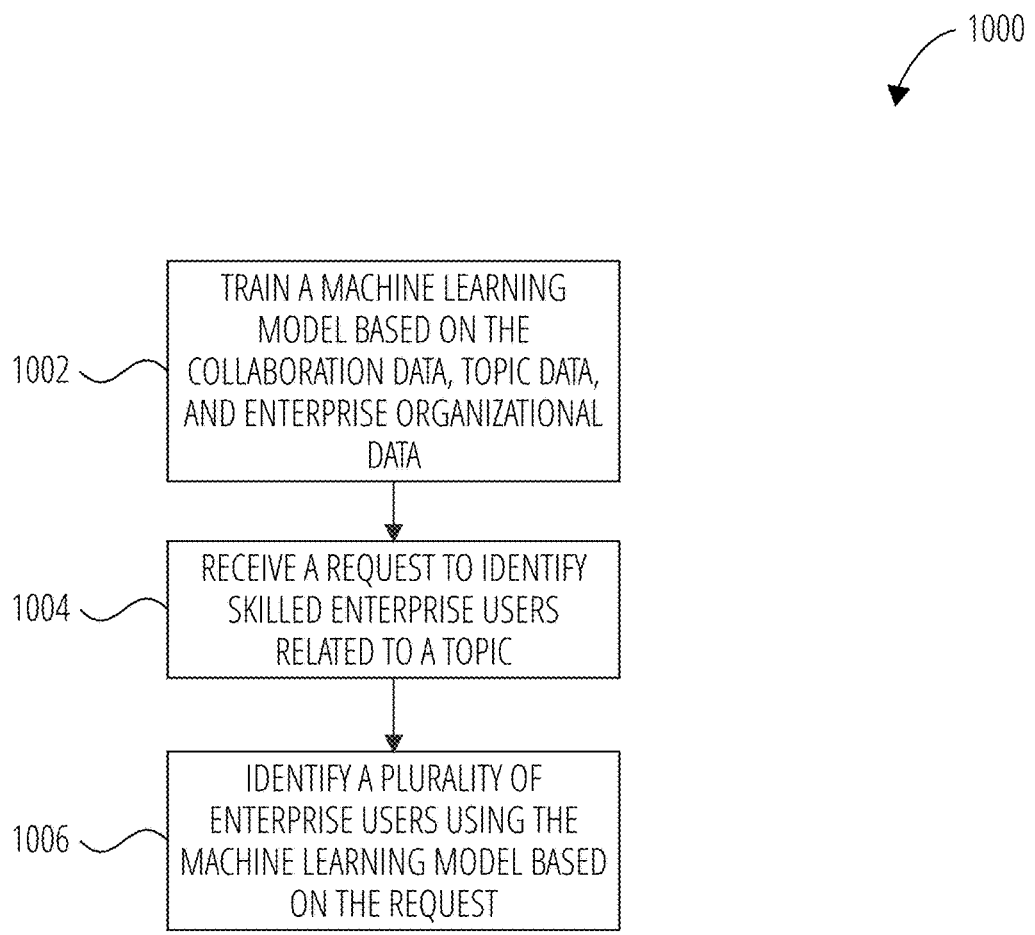
FIG. 10 is a flow diagram illustrating a method for identifying skilled users in accordance with one example embodiment.

FIG. 10 is a flow diagram illustrating a method 1000 for identifying skilled users in accordance with one example embodiment. Operations in the method 1000 may be performed by the graph engine 128, using components (e.g., modules, engines) described above with respect to FIG. 3. Accordingly, the method 1000 is described by way of example with reference to the graph engine 128. However, it shall be appreciated that at least some of the operations of the method 1000 may be deployed on various other hardware configurations or be performed by similar components residing elsewhere. For example, some of the operations may be performed at the expert finder module 110.

At block 1002, the machine learning module 404 trains a machine learning model based on the collaboration data, topic data, and enterprise organizational data. At block 1004, the skills module 506 receives a request to identify skilled enterprise users related to a topic. At block 1006, the skills module 506 identifies a plurality of enterprise users using the machine learning model based on the request.

Figure 11:
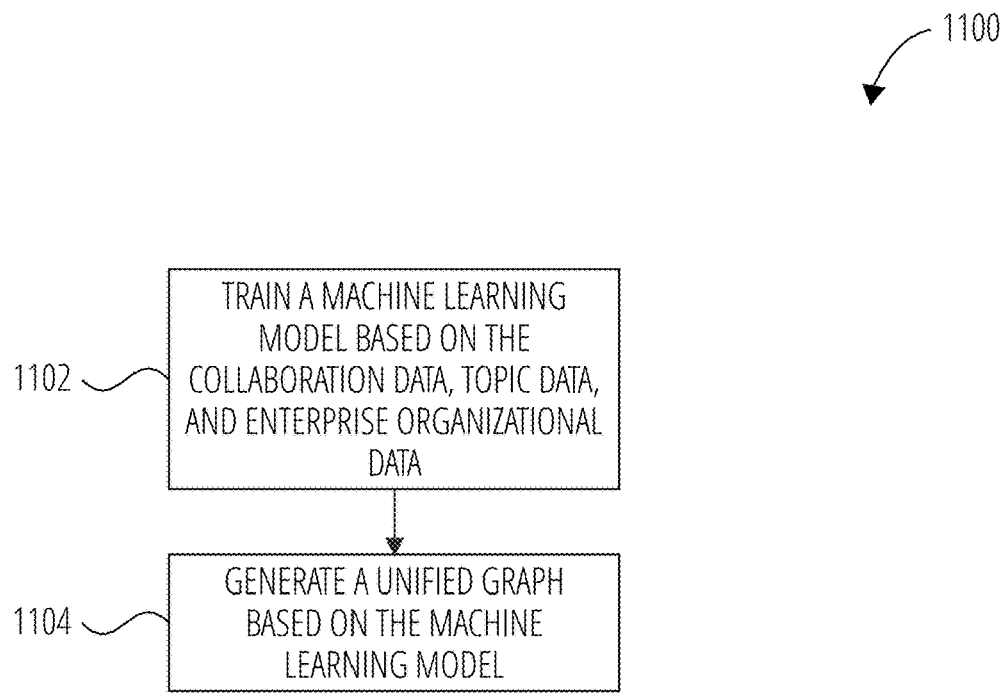
FIG. 11 is a flow diagram illustrating a method for generating a unified graph in accordance with one example embodiment.

FIG. 11 is a flow diagram illustrating a method 1100 for generating a unified graph in accordance with one example embodiment. Operations in the method 1100 may be performed by the graph engine 128, using components (e.g., modules, engines) described above with respect to FIG. 3. Accordingly, the method 1100 is described by way of example with reference to the graph engine 128. However, it shall be appreciated that at least some of the operations of the method 1100 may be deployed on various other hardware configurations or be performed by similar components residing elsewhere. For example, some of the operations may be performed at the expert finder module 110.

At block 1102, the machine learning module 404 trains a machine learning model based on the collaboration data, topic data, and enterprise organizational data. At block 1104, the organization network visualization module 508 generates a unified (collaboration-topic-organizational) graph based on the machine learning model.

FIG. 12 illustrates an example of a unified graph 1200 in accordance with one example embodiment. The unified graph 1200 illustrates interactions between person A 1202, customer A 1204, person B 1214, person C 1220, customer B 1222, and person D 1216 related to topic 1 1206, project 1 1210, skill 1 1208, project 2 1212, topic 2 1218, and skill 2 1224. The collaboration metrics of person A 1202 indicate an influence index of 0.9, a centrality index of 20, and a reach index of 0.8. The user profile of person A 1202 indicates that his/her role is Research and Development (R&D).

In block 1302, routine 1300 identifies collaboration metrics based on user interaction data of users of an application from an enterprise. In block 1304, routine 1300 accesses enterprise organizational data of the enterprise. In block 1306, routine 1300 identifies topic data from the user interaction data and the enterprise organizational data. In block 1308, routine 1300 trains a machine learning model based on the collaboration metrics, the enterprise organizational data, and the topic data.

Figure 14:
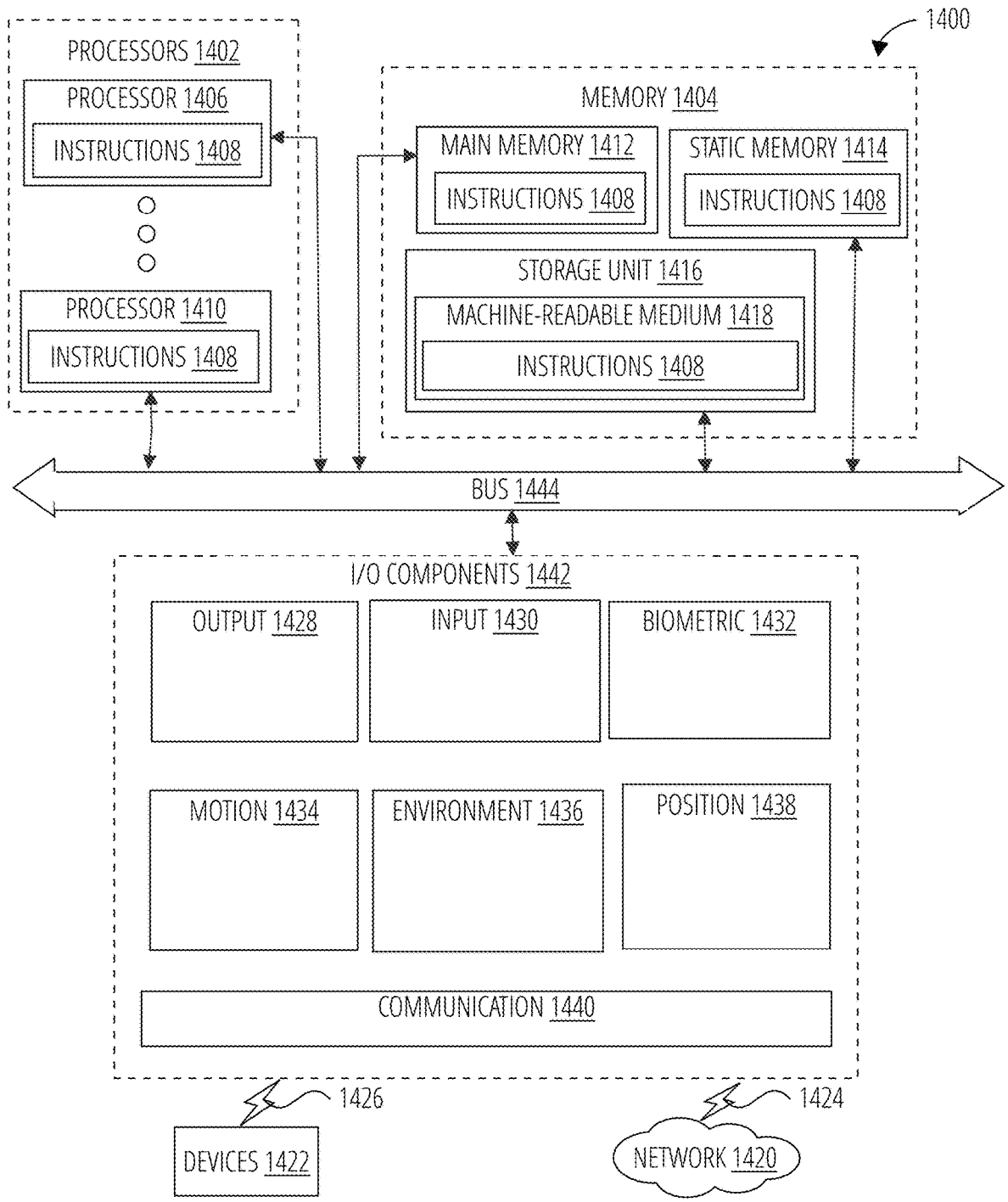
FIG. 14 is a diagrammatic representation of a machine in the form of a computer system within which a set of instructions may be executed for causing the machine to perform any one or more of the methodologies discussed herein, according to an example embodiment.

FIG. 14 is a diagrammatic representation of the machine 1400 within which instructions 1408 (e.g., software, a program, an application, an applet, an app, or other executable code) for causing the machine 1400 to perform any one or more of the methodologies discussed herein may be executed. For example, the instructions 1408 may cause the machine 1400 to execute any one or more of the methods described herein. The instructions 1408 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1408, sequentially or otherwise, that specify actions to be taken by the machine 1400. Further, while only a single machine 1400 is illustrated, the term "machine" shall also be taken to include a collection of machines that individually or jointly execute the instructions 1408 to perform any one or more of the methodologies discussed herein.

The machine 1400 may include processors 1402, memory 1404, and I/O components 1442, which may be configured to communicate with each other via a bus 1444. In an example embodiment, the processors 1402 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1406 and a processor 1410 that execute the instructions 1408. The term "processor" is intended to include multi-core processors that may comprise two or more independent processors (sometimes referred to as "cores") that may execute instructions contemporaneously. Although FIG. 14 shows multiple processors 1402, the machine 1400 may include a single processor with a single core, a single processor with multiple cores (e.g., a multi-core processor), multiple processors with a single core, multiple processors with multiples cores, or any combination thereof.

The memory 1404 includes a main memory 1412, a static memory 1414, and a storage unit 1416, both accessible to the processors 1402 via the bus 1444. The main memory 1404, the static memory 1414, and storage unit 1416 store the instructions 1408 embodying any one or more of the methodologies or functions described herein. The instructions 1408 may also reside, completely or partially, within the main memory 1412, within the static memory 1414, within machine-readable medium 1418 within the storage unit 1416, within at least one of the processors 1402 (e.g., within the processor's cache memory), or any suitable combination thereof, during execution thereof by the machine 1400.

The I/O components 1442 may include a wide variety of components to receive input, provide output, produce output, transmit information, exchange information, capture measurements, and so on. The specific I/O components 1442 that are included in a particular machine will depend on the type of machine. For example, portable machines such as mobile phones may include a touch input device or other such input mechanisms, while a headless server machine will likely not include such a touch input device. It will be appreciated that the I/O components 1442 may include many other components that are not shown in FIG. 14. In various example embodiments, the I/O components 1442 may include output components 1428 and input components 1430. The output components 1428 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1430 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1442 may include biometric components 1432, motion components 1434, environmental components 1436, or position components 1438, among a wide array of other components. For example, the biometric components 1432 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1434 include acceleration sensor components (e.g., accelerometer), gravitation sensor components, rotation sensor components (e.g., gyroscope), and so forth. The environmental components 1436 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1438 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1442 further include communication components 1440 operable to couple the machine 1400 to a network 1420 or devices 1422 via a coupling 1424 and a coupling 1426, respectively. For example, the communication components 1440 may include a network interface component or another suitable device to interface with the network 1420. In further examples, the communication components 1440 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1422 may be another machine or any of a wide variety of peripheral devices (e.g., a peripheral device coupled via a USB).

Moreover, the communication components 1440 may detect identifiers or include components operable to detect identifiers. For example, the communication components 1440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1440, such as location via Internet Protocol (IP) geolocation, location via Wi-Fi® signal triangulation, location via detecting an NFC beacon signal that may indicate a particular location, and so forth.

The various memories (e.g., memory 1404, main memory 1412, static memory 1414, and/or memory of the processors 1402) and/or storage unit 1416 may store one or more sets of instructions and data structures (e.g., software) embodying or used by any one or more of the methodologies or functions described herein. These instructions (e.g., the instructions 1408), when executed by processors 1402, cause various operations to implement the disclosed embodiments.

The instructions 1408 may be transmitted or received over the network 1420, using a transmission medium, via a network interface device (e.g., a network interface component included in the communication components 1440) and using any one of a number of well-known transfer protocols (e.g., hypertext transfer protocol (HTTP)). Similarly, the instructions 1408 may be transmitted or received using a transmission medium via the coupling 1426 (e.g., a peer-to-peer coupling) to the devices 1422.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

EXAMPLES

Example 1 is a computer-implemented method comprising: identifying collaboration metrics based on user interaction data of users of an application from an enterprise; accessing enterprise organizational data of the enterprise; identifying topic data from the user interaction data and the enterprise organizational data; and training a machine learning model based on the collaboration metrics, the enterprise organizational data, and the topic data.

Example 2 includes example 1, further comprising: accessing the user interaction data from the application, the user interaction data indicating interactions among the users using the application at the enterprise.

Example 3 includes any of the above examples, wherein the enterprise organizational data indicates a profile for each user, and a network relation graph of the users.

Example 4 includes any of the above examples, wherein the profile of for each user comprises a human resource attribute, a skill attribute, and a project attribute, and wherein the network relation graph indicates a degree of connections, a closeness index, and an influence index.

Example 5 includes any of the above examples, further comprising: receiving, from a first device of a first user, an expert request indicating a topic attribute; and identifying, using the machine learning model, a second user corresponding to the topic attribute.

Example 6 includes any of the above examples, wherein identifying the second user further comprises: using the machine learning model, ranking one or more users as an expert for the topic attribute based on social network metrics between the first user and the users of the application, and profiles of the users of the application; and identifying the second user from the ranked one or more users.

Example 7 includes any of the above examples, further comprising: in response to identifying the second user, providing an anonymous recommendation of the second user to the first user; communicating the expert request to the second user; in response to communicating the expert request, receiving an approval response from a second device of the second user; in response to receiving the approval response from the second device, providing an identification of the second user to the first device.

Example 8 includes any of the above examples, wherein the machine learning model identifies the second user based on a network degree of connection between the first user and the second user, network metrics of the first user and the second user, and topics associated with the second user.

Example 9 includes any of the above examples, wherein the collaboration metrics for a user indicate at least one of a collaboration topic, a collaboration pattern, a collaboration time on a topic from the user, a number of past requests for the user, response times from the user, or a request-response rate of the user.

Example 10 includes any of the above examples, further comprising: updating collaboration metrics based on updated user interaction data of the users; accessing updated enterprise organizational data of the enterprise; updating the identified topic data from the updated user interaction data and the updated enterprise organizational data; and retraining the learning machine model based on the updated collaboration metrics, the updated enterprise organizational data, and the updated identified topic data, wherein the application comprises at least one of an email application, an instant message application, a document sharing application, a meeting application, or a calendar application.

What is claimed is:

1. A computer-implemented method comprising:
   identifying collaboration metrics based on user interaction data of users of an application from an enterprise;
   accessing enterprise organizational data of the enterprise;
   identifying topic data from the user interaction data and the enterprise organizational data;
   training, at a server, a machine learning model based on the collaboration metrics, the enterprise organizational data, the topic data, and reply trends from expert users based on a number of degree of separation from users requesting expert assistance from the expert users;
   updating, at the server, a directory application based on the machine learning model by updating the enterprise organizational data with topic data and skill ranking data of the expert users;
   receiving, from a first device of a first user, an expert request that comprises a free form user input query;

operating a machine learning-based natural language processor to translate the free form user input query into contextual search conditions indicating a topic attribute; and identifying, using the machine learning model, a second user corresponding to the topic attribute by ranking one or more users as an expert for the topic attribute based on social network metrics between the first user and the users of the application, and profiles of the users of the application, the profiles of the users comprising a reach index, an expert page rank, a collaboration time on a first topic, past requests response times, request response rates, referral recommendations, and open requests in request queues of the users, and identifying the second user from the ranked one or more users.

2. The computer-implemented method of claim 1, further comprising:

accessing the user interaction data from the application, the user interaction data indicating interactions among the users using the application at the enterprise.

3. The computer-implemented method of claim 1, wherein the enterprise organizational data indicates a profile for each user, and a network relation graph of the users.

4. The computer-implemented method of claim 3, wherein the profile of for each user comprises a human resource attribute, a skill attribute, and a project attribute, and wherein the network relation graph indicates a degree of connections, a closeness index, and an influence index.

5. The computer-implemented method of claim 1, further comprising:

in response to identifying the second user, providing an anonymous recommendation of the second user to the first user;

communicating the expert request to the second user;

in response to communicating the expert request, receiving an approval response from a second device of the second user; and in response to receiving the approval response from the second device, providing an identification of the second user to the first device.

6. The computer-implemented method of claim 1, wherein the machine learning model identifies the second user based on a network degree of connection between the first user and the second user, network metrics of the first user and the second user, topics associated with the second user, a number of emails composed by the second user where the emails indicate a first topic, and a frequency of collaboration between the second user and other users on projects related to the first topic.

7. The computer-implemented method of claim 1, wherein the collaboration metrics for a user indicate at least one of a collaboration topic, a collaboration pattern, a collaboration time on a topic from the user, a number of past requests for the user, response times from the user, or a request-response rate of the user.

8. The computer-implemented method of claim 1, further comprising:

updating collaboration metrics based on updated user interaction data of the users;

accessing updated enterprise organizational data of the enterprise;

updating the identified topic data from the updated user interaction data and the updated enterprise organizational data; and retraining the machine learning model based on the updated collaboration metrics, the updated enterprise organizational data, and the updated identified topic data, wherein the application comprises at least one of an email application, an instant message application, a document sharing application, a meeting application, or a calendar application.

9. A computing apparatus, the computing apparatus comprising:

a processor; and a memory storing instructions that, when executed by the processor, configure the apparatus to:

identify collaboration metrics based on user interaction data of users of an application from an enterprise;

access enterprise organizational data of the enterprise;

identify topic data from the user interaction data and the enterprise organizational data; and train a machine learning model based on the collaboration metrics, the enterprise organizational data, the topic data, and reply trends from expert users based on a number of degree of separation from users requesting expert assistance from the expert users;

update a directory application based on the machine learning model by updating the enterprise organizational data with topic data and skill ranking data of the expert users;

receiving, from a first device of a first user, an expert request that comprises a free form user input query;

operating a machine learning-based natural language processor to translate the free form user input query into contextual search conditions indicating a topic attribute; and identifying, using the machine learning model, a second user corresponding to the topic attribute by ranking one or more users as an expert for the topic attribute based on social network metrics between the first user and the users of the application, and profiles of the users of the application, the profiles of the users comprising a reach index, an expert page rank, a collaboration time on a first topic, past requests response times, request response rates, referral recommendations, and open requests in request queues of the users, and identifying the second user from the ranked one or more users.

10. The computing apparatus of claim 9, wherein the instructions further configure the apparatus to:

access the user interaction data from the application, the user interaction data indicating interactions among the users using the application at the enterprise.

11. The computing apparatus of claim 9, wherein the enterprise organizational data indicates a profile for each user, and a network relation graph of the users.

12. The computing apparatus of claim 11, wherein the profile for each user comprises a human resource attribute, a skill attribute, and a project attribute, and wherein the network relation graph indicates a degree of connections, a closeness index, and an influence index.

13. The computing apparatus of claim 9, wherein the instructions further configure the apparatus to:

in response to identifying the second user, provide an anonymous recommendation of the second user to the first user;

communicate the expert request to the second user;

in response to communicating the expert request, receive an approval response from a second device of the second user;

in response to receiving the approval response from the second device, provide an identification of the second user to the first device.

14. The computing apparatus of claim 9, wherein the machine learning model identifies the second user based on a network degree of connection between the first user and the second user, network metrics of the first user and the second user, and topics associated with the second user, a number of emails composed by the second user where the emails indicate a first topic, and a frequency of collaboration between the second user and other users on projects related to the first topic.

15. The computing apparatus of claim 9, wherein the collaboration metrics for a user indicate at least one of a collaboration topic, a collaboration pattern, a collaboration time on a topic from the user, a number of past requests for the user, response times from the user, or a request-response rate of the user.

16. A non-transitory computer-readable storage medium, the computer-readable storage medium including instructions that when executed by a computer, cause the computer to:
    identify collaboration metrics based on user interaction data of users of an application from an enterprise;
    access enterprise organizational data of the enterprise;
    identify topic data from the user interaction data and the enterprise organizational data; and
    train a machine learning model based on the collaboration metrics, the enterprise organizational data, the topic data, and reply trends from expert users based on a number of degree of separation from users requesting expert assistance from the expert users;
    update a directory application based on the machine learning model by updating the enterprise organizational data with topic data and skill ranking data of the expert users;
    receive, from a first device of a first user, an expert request that comprises a free form user input query;
    operate a machine learning-based natural language processor to translate the free form user input query into contextual search conditions indicating a topic attribute; and
    identify, using the machine learning model, a second user corresponding to the topic attribute by ranking one or more users as an expert for the topic attribute based on social network metrics between the first user and the users of the application, and profiles of the users of the application, the profiles of the users comprising a reach index, an expert page rank, a collaboration time on a first topic, past requests response times, request response rates, referral recommendations, and open requests in request queues of the users, and identifying the second user from the ranked one or more users.

* * * * *